United States Patent
Jesus et al.

(10) Patent No.: US 10,551,518 B2
(45) Date of Patent: Feb. 4, 2020

(54) METHOD TO CORRECT ECCENTRICITY IN ULTRASONIC IMAGE PROFILES

(71) Applicant: PETROLEO BRASILEIRO S.A.—PETROBRAS, Rio de Janeiro, RJ (BR)

(72) Inventors: Candida Menezes de Jesus, Rio de Janeiro (BR); Andre Luiz Martins Compan, Rio de Janeiro (BR); Rodrigo Surmas, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 352 days.

(21) Appl. No.: 15/269,052

(22) Filed: Sep. 19, 2016

(65) Prior Publication Data
US 2017/0082767 A1   Mar. 23, 2017

(30) Foreign Application Priority Data
Sep. 17, 2015   (BR) .......................... 10 2015 023982

(51) Int. Cl.
*G01V 1/48* (2006.01)

(52) U.S. Cl.
CPC ............ *G01V 1/48* (2013.01); *G01V 2210/59* (2013.01)

(58) Field of Classification Search
CPC ........ G01V 1/44; G01V 1/48; G01V 2210/54; G01V 2210/59; E21B 47/082; E21B 47/0002
See application file for complete search history.

(56) References Cited

U.S. PATENT DOCUMENTS

| | | |
|---|---|---|
| 2008/0170466 A1 | 7/2008 | Mickael |
| 2009/0084176 A1* | 4/2009 | Hassan ................... E21B 47/08 73/152.57 |
| 2009/0185447 A1 | 7/2009 | Yogeswaren |
| 2010/0265796 A1* | 10/2010 | Steinsiek .............. B06B 1/0622 367/35 |

(Continued)

FOREIGN PATENT DOCUMENTS

| | | |
|---|---|---|
| GB | 2376078 A | 12/2002 |
| WO | 2002/048499 A2 | 6/2002 |

OTHER PUBLICATIONS

Zengbao Chen, Xiaohong Chen, Yanghua Wang and Jingye Li., "Estimation of Q factors from reflection seismic data for a band-limited and stabilized inverse Q filter driven by an average-Q model"., Journal of Applied Geophysics 101 (2014) 86-94.*

*Primary Examiner* — Yoshihisa Ishizuka
(74) *Attorney, Agent, or Firm* — Sughrue Mion, PLLC

(57) ABSTRACT

This invention relates to a method of correcting eccentricity of ultrasonic image profiles, measured along a section of rock, including the steps of measuring emitted amplitude values ($A_0$) and measuring transit time values ($t_\theta$) of ultrasonic acoustic pulses emitted at a range of default angles ($\theta$), where the amplitude measured at each angle ($A_\theta$) is determined by an amplitude decay model in relation to the transit time ($t_\theta$) defined by $A_\theta = A_0 e^{-t_\theta/\tau} I_\theta$ where $\tau$ is the decay correction factor; and $I_\theta$ is the reflection coefficient of the rock wall.

3 Claims, 4 Drawing Sheets

(56) References Cited

U.S. PATENT DOCUMENTS

2012/0176862 A1* 7/2012 D'Angelo ............. E21B 47/101
367/35
2015/0177409 A1* 6/2015 Sofiienko ............... G01V 5/125
250/269.1

* cited by examiner

METHOD TO CORRECT ECCENTRICITY IN ULTRASONIC IMAGE PROFILES

AREA OF INVENTION

This invention involves a method to correct ultrasonic image profiles normally acquired in oil wells, in which the amplitude image profile generated is subject to attenuation effects caused by the eccentricity of the tool responsible for the measurements.

BACKGROUND ON THE INVENTION

The acquisition of ultrasonic image profiles, also referred to as acoustic images, is widely used for geological analysis of oil reservoirs. These images allow for textural, structural, geometric and reservoir quality analysis by means of the acoustic properties of the rocks. This analysis allows for characterization of reservoirs by the types of rock present and by productivity potential.

Ultrasonic image profiles are acquired using a tool capable of emitting acoustic wave pulses that propagate through the drilling fluid until they reach the wall of the well, where they are reflected and bounce back to the tool that registers transit time and amplitude properties through the transducer.

These profiles are acquired in uncoated boreholes, such as oil wells. The acoustic pulses are emitted along the entire circumference of the wall of the wells. After they are reflected, these pulses are measured around the entire acquisition tool.

Sound waves are reflected due to the contrasting impedance between the fluid-rock medium. The higher the contrast in impedance, the greater the amplitude of the reflected waves. The graphical representation of the amplitude and transit time measurements at depth generates a 360° image of the profiled section of the well.

The emission of acoustic waves usually takes place through a transducer, which is a piezoelectric crystal, namely a crystal capable of transforming an electrical pulse into a pulse of mechanical waves and vice versa.

FIG. 1 illustrates a cross section of a well from which an image profile is to be generated, wherein tool 1 is positioned as described above. Tool 1 is represented in the center of the well, which has a transducer 11 for emission of ultrasonic waves. The waves propagate through drilling fluid 2 until they reach wall 4 of the well, at which point they are then reflected off wall 4 of the reservoir, returning to transducer 11, which also has the means of recording the reception of such waves.

As described above, based on the transit time and amplitude records of the waves, it is possible to determine a number of characteristics of rock 3 of the profiled section of the reservoir, generating 360° images (a complete vision of a section) of the well wall.

However, the tool used to generate this image is subjected to the eccentricity of its position, causing attenuation of the acoustic waves to be related to the geometrical effect and not to the acoustic properties of the reservoir as is desired.

The eccentricity of the position of the tool can be caused by both inefficiencies in centralizing the tool during the acquisition of the profile and by variations in well geometry. Oil wells are ideally produced with cylindrical geometry, however, it is extremely common for there to be variations in this geometry, mainly due to oscillations of the drill bits whilst the well is being drilled. FIG. 2a (taken from the book "novel mechanical caliper image while drilling and borehole image analysis" by Junichi Sugiura) and FIG. 2b (taken from the article "Borehole Imaging Course" by Pavlovic, D. M. and Castillo, H., 2004) illustrate two graphical representations of wells that suffered a spiraling effect, as described above.

FIG. 3 illustrates a second cause of eccentricity of measuring tool 1, which is related to the oval well shape. In this case, even if tool 1 is positioned at the center of the well, the well shape creates varying distances between the tool and the wall since walls 4 of the well will never be equidistant from equipment 1.

FIG. 4 illustrates a final cause of the eccentricity of tool 1, which is related to the eccentric position of tool 1 itself. In this case, even if the well has a perfectly cylindrical shape, the erroneous positioning of the tool 1 generates variable distances between the tool and the wall, since it is closer to one wall 4 than another.

The eccentricity generates an unwanted effect on data acquired due to the change of distance between the transducer and the rock wall along the circumference of the well. Greater or lesser distances between the transducer and the wall result in greater or lesser attenuation of acoustic waves, generating a background of amplitudes that does not reflect the intrinsic characteristics of the rocks but reflects the geometric effect.

Therefore, whatever the cause of such eccentricity, it is known that it undermines the obtaining of acoustic properties intrinsic to the reservoir, so it is important that such a phenomenon is corrected in the amplitude image after the acquisition of the signals that generate this image.

However, with the prior art, there is no known adequate processing of the images generated to correct eccentricity. The prior eccentric correction processing art is known as Eccentering Correction and merely equalizes the amplitudes along lines parallel to the circumference of the image. Although this prior art improves the generated image, it generates sub-horizontal artifacts in regions of the well in which the variance of amplitude is very high (such as fracture zones, vugs and caves). Such artifacts in many cases make it impossible to quantitatively use the corrected image.

Another undesired effect of this correction method results in assigning spurious amplitude values, which generates a loss to the original impedance characteristics of the reservoir.

Thus, it is clear that the prior art lacks a correction method of ultrasonic images that is able to correct any deviations due to the eccentricity of the tool that acquires these images.

SUMMARY OF THE INVENTION

The main objective of this invention is to provide a method to correct ultrasonic image profiles given the effects of attenuation due to the eccentricity of the tool that takes the measurements.

Thus, in order to meet this objective, this invention provides a method to correct eccentricity of ultrasonic image profiles, measured along a section of rock including steps to measure amplitude values emitted ($A_0$) and measure transit time values ($t_\theta$) of ultrasonic acoustic pulses emitted at a range of default angles ($\theta$), where the amplitude measured for each angle ($A_\theta$) is determined by an amplitude decay model in relation to the transit time ($t_\theta$) defined by $A_\theta = A_0 \cdot e^{-t_\theta/\tau} \cdot I_\theta$, wherein $\tau$ is the decay correction factor; and $I_\theta$ is the reflection coefficient of the rock wall.

BRIEF DESCRIPTION OF THE FIGURES

The detailed description provided below is for the attached figures and their respective reference numbers, showing the modalities of this invention. The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
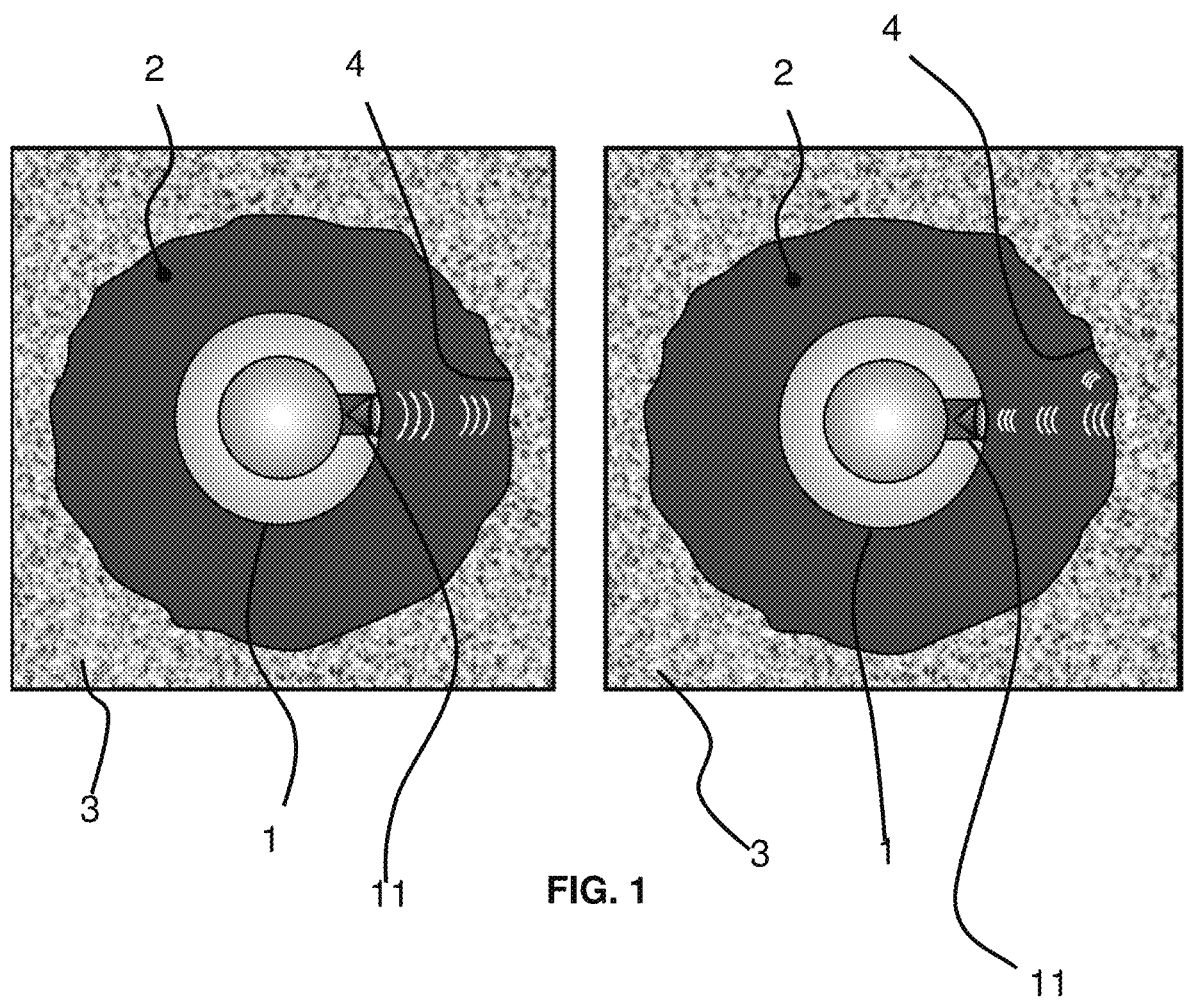
FIG. 1 illustrates a cross section of a well in which an ultrasonic image profile is to be generated, in which an ultrasonic pulse generating tool is positioned.
Figure 2A:
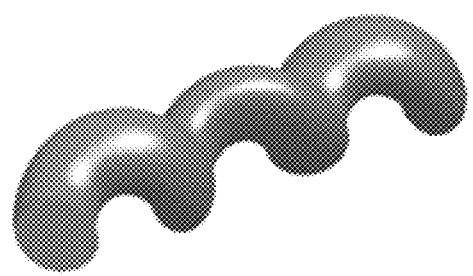
FIG. 2a illustrates the first graphical representation of a well suffering a spiraling effect, a first cause of eccentricity of ultrasonic measurement tools.
Figure 2B:
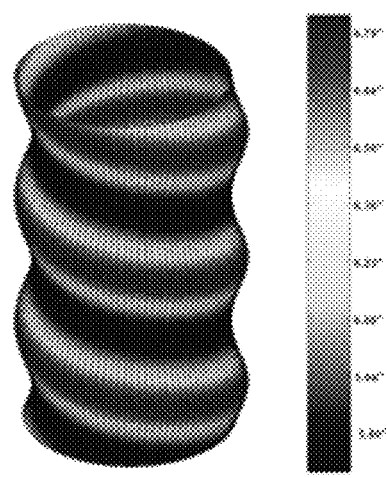
FIG. 2b illustrates a second graphical representation of a well suffering a spiraling effect, a first cause of eccentricity of ultrasonic measurement tools.
Figure 3:
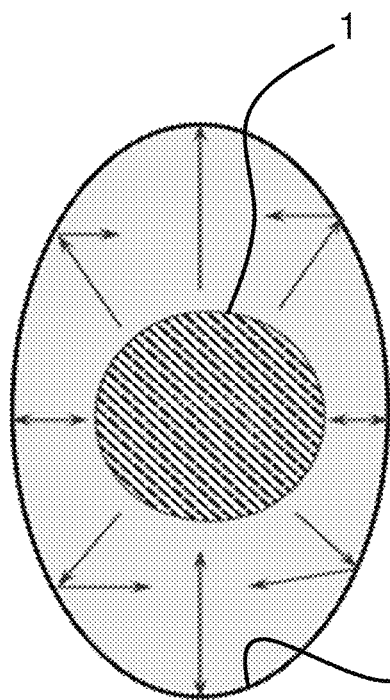
FIG. 3 illustrates a second cause of eccentricity of ultrasonic measurement tools, which is related to the oval shape of a well.
Figure 4:
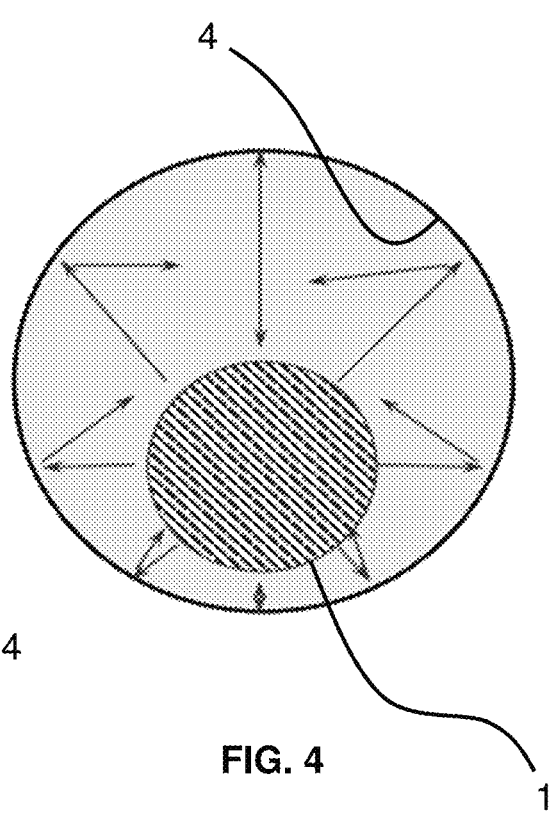
FIG. 4 illustrates a third cause of eccentricity of ultrasonic measurement tools, which is related to the eccentric positioning of the tool itself.

This invention involves a method to correct ultrasonic image profiles, preferably ultrasonic borehole image profiles for any type of uncoated reservoir, more preferably of oil wells. The correction in question is necessary due to eccentricity issues, due to several factors, among them well spiraling, the oval shape of the well and the eccentricity of the tool itself.

Ultrasonic image profiles are acquired using a tool capable of emitting acoustic wave pulses that propagate through the drilling fluid until they reach the wall of the well, where they are reflected and bounce back to the tool that registers transit time and amplitude properties through the transducer.

Sound waves are reflected due to the contrasting impedance between the fluid-rock medium. The higher the contrast in impedance, the greater the amplitude of the reflected waves. Stacking the amplitude and transit time at depth measurements generates a 360° image of the profiled section of the well.

As discussed, the amplitude measured is greatly affected by the eccentricity since the acoustic waves suffer attenuation along their trajectory in the drilling fluid. The greater the distance traveled, the greater the attenuation, and vice versa. Thus varying distances between transducer and rock along the circumference of the well result in variable attenuation and, consequently, in variable amplitude along this circumference.

These variations in amplitude represent a sum of the effect of geometric attenuation (eccentricity) and of the impedance contrast between the fluid and the reservoir. The transit time measurements provide a model of the variation of the distance between the transducer and the rock, and consequently the eccentricity. So, knowing that the control of transit time in the amplitude background measured in the profile is a function of an attenuation process, according to this invention, this phenomenon is modeled by a decay equation of amplitude to transit time.

Therefore, in summary, the invention provides a method to correct eccentricity of ultrasonic image profiles, measured along a rock section, including the steps of measuring amplitude values emitted $A_0$ and measuring transit time values $t_\theta$ of the ultrasonic acoustic pulses emitted in a range of $\theta$ default angles, in which the amplitude measured at each angle $A_\theta$ is determined by a decay model for amplitude to transit time $t_\theta$, defined by the equation:

$$A_\theta = A_0 \cdot e^{-t_\theta/\tau} \cdot I_\theta, \qquad (1)$$

where $\tau$ is the decay correction factor; and $I_\theta$ is the reflection coefficient of the rock wall.

In other words, the amplitude $A_\theta$ measured in each direction $\theta$ is a function of the amplitude emitted $A_0$ multiplied by the exponential of the ratio of transit time $t_\theta$ to decay correction factor $\tau$ and multiplied by the reflection coefficient of the rock wall $I_\theta$.

Preferably, ultrasonic acoustic pulses are emitted in a range of default $\theta$ angles, as described above. The default of such angles may be random so as to be dependent on software, for example. In other configurations, the default may be set at intervals of angles, such as at every 1° or 2°, amongst other angle values. Optionally, the range of angles is 360°, covering the whole circumference of a reservoir.

After obtaining the decay factor of $\tau$, the eccentricity of the amplitude image is corrected, which is amplified by the inverse of the decay equation and re-scaled to the average value by an average of corrections applied $\bar{c}$ in accordance with the equations (2) and (3) below.

$$A_{\theta c} = A_\theta \cdot e^{\left(\frac{t_\theta}{\tau}\right)} / \bar{c} \qquad (2)$$

$$\bar{c} = \frac{1}{N} \sum_{\theta=1}^{N} \left( \frac{1}{q} \sum_{prof=1}^{q} e^{t_\theta(prof)/\tau} \right) \qquad (3)$$

Where:
$A_{\theta c}$=Corrected Amplitude;
$\bar{c}$=Average of applied corrections;
N=number of radial measurements (180);
q=number of measurement lines in the layer sampled; and
prof=each of the data lines referenced to a certain depth.

Calculation of the decay correction factor $\tau$ in a complete image file, where the layers present their intrinsic heterogeneities is optionally achieved through an optimization process. To do so, the method of the invention uses objective functions with statistical parameters to determine the decay correction factor $\tau$. It was found that the smaller the standard deviations, the higher the kurtosis deviations, and more negative values of asymmetry are consistent with the best correction results. Optionally, the objective function is a multivariate objective function.

Note that the eccentricity correction method described applies to correcting the ultrasonic amplitude image profile of any type of tool.

Although the method is described as being applicable to oil wells, it is important to point out that such an eccentricity correction method for ultrasonic imaging profiles can be applied to boreholes for any type of uncoated reservoir including, but not limited to, oil wells.

Preferably, the eccentricity correction method can be applied to a tool that measures amplitude and transit time by a transducer emitting and receiving ultrasonic waves.

Figure 5:
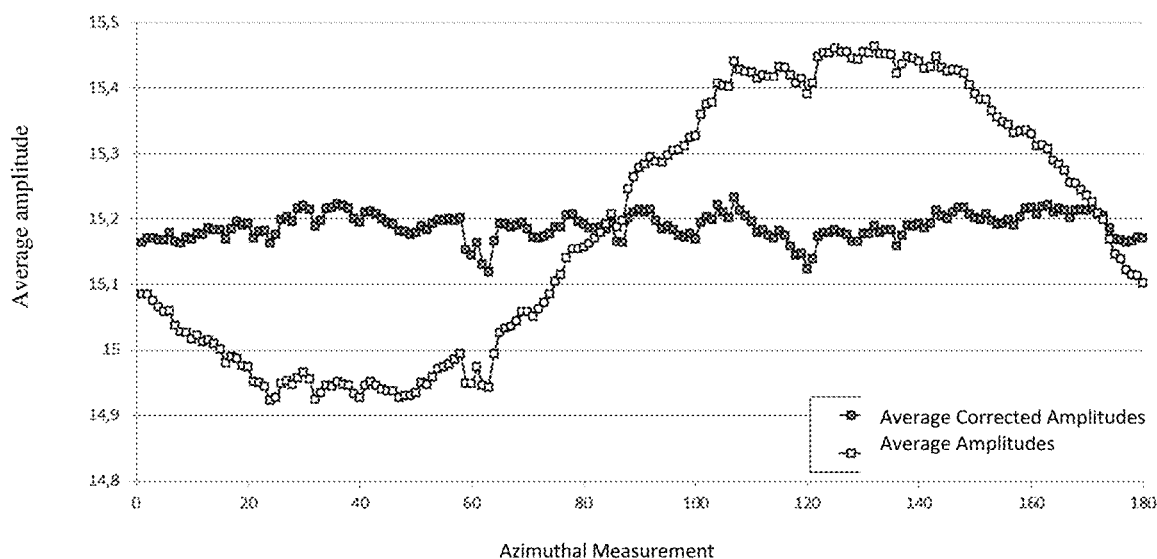
FIG. 5 illustrates amplitude data of a homogeneous layer with an eccentricity effect (average amplitudes) and the same data after applying the method of this invention (average amplitudes corrected).

FIG. 5 illustrates amplitude values extracted from data from a layer of homogeneous rock with acoustic properties. The Average Amplitudes curve is the oscillatory behavior of the amplitude controlled by varying the distance between the transducer and the well wall. The Corrected Average Amplitudes curve was generated after applying the method of the invention, where one can observe removal of this oscillation and conservation of small variations intrinsic to the rock.

For additional tests, the correction method for ultrasonic image profiles of this invention was applied to the acoustic image profiles of two wells with different degrees of eccentricity, and compared with the known correction method of the prior art. The results are illustrated in FIGS. 6 and 7.

As will be clear from the explanations below, note that the corrections obtained were very satisfactory and even allowed for the extraction of permo-porous properties of the reservoirs.

Figures 6A, 6B, 6C:
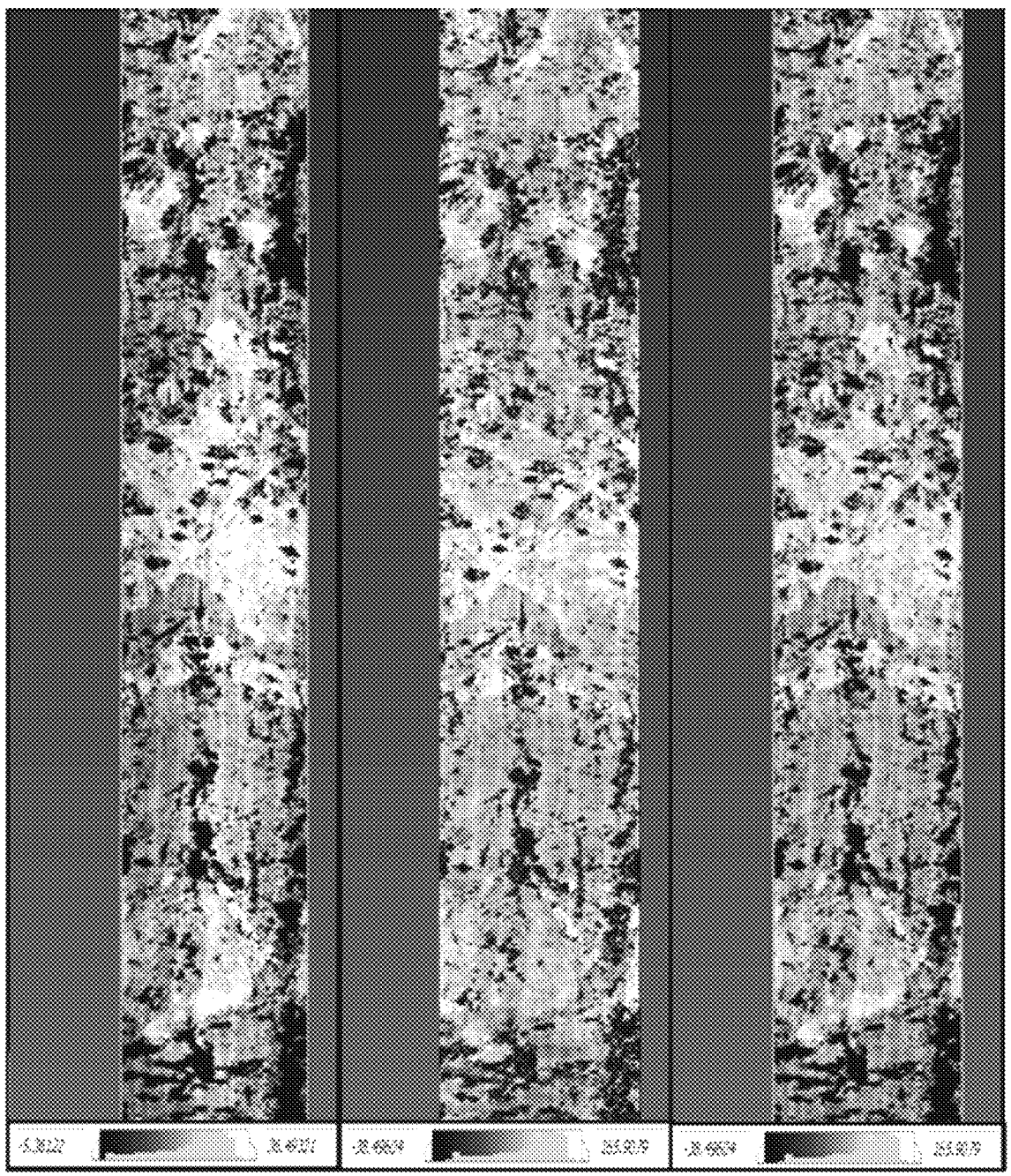
FIGS. 6a-6c illustrate a comparison of a first uncorrected ultrasonic amplitude image profile after being corrected by a known method of the prior art, and after being corrected by the correction method of an ultrasonic images profile of this invention.

FIG. 6 illustrates the comparison of a first uncorrected ultrasonic image profile, with a known correction method of the prior art and with the proposed correction method, where the ultrasonic amplitude image profile of a first reservoir without any correction method applied is initially illustrated 6a. Then the same profile is illustrated after undergoing a correction process known from art 6b. Finally, the same profile 6a is shown after undergoing the 6c correction process shown here. By comparing the images shown, it is observed that after application of the eccentricity correction method of this invention 6c the eccentricity effect is substantially reduced, while the amplitude properties of the reservoir layers are preserved. Which is not obtained by the known correction method of the prior art.

Figures 7A, 7B, 7C:
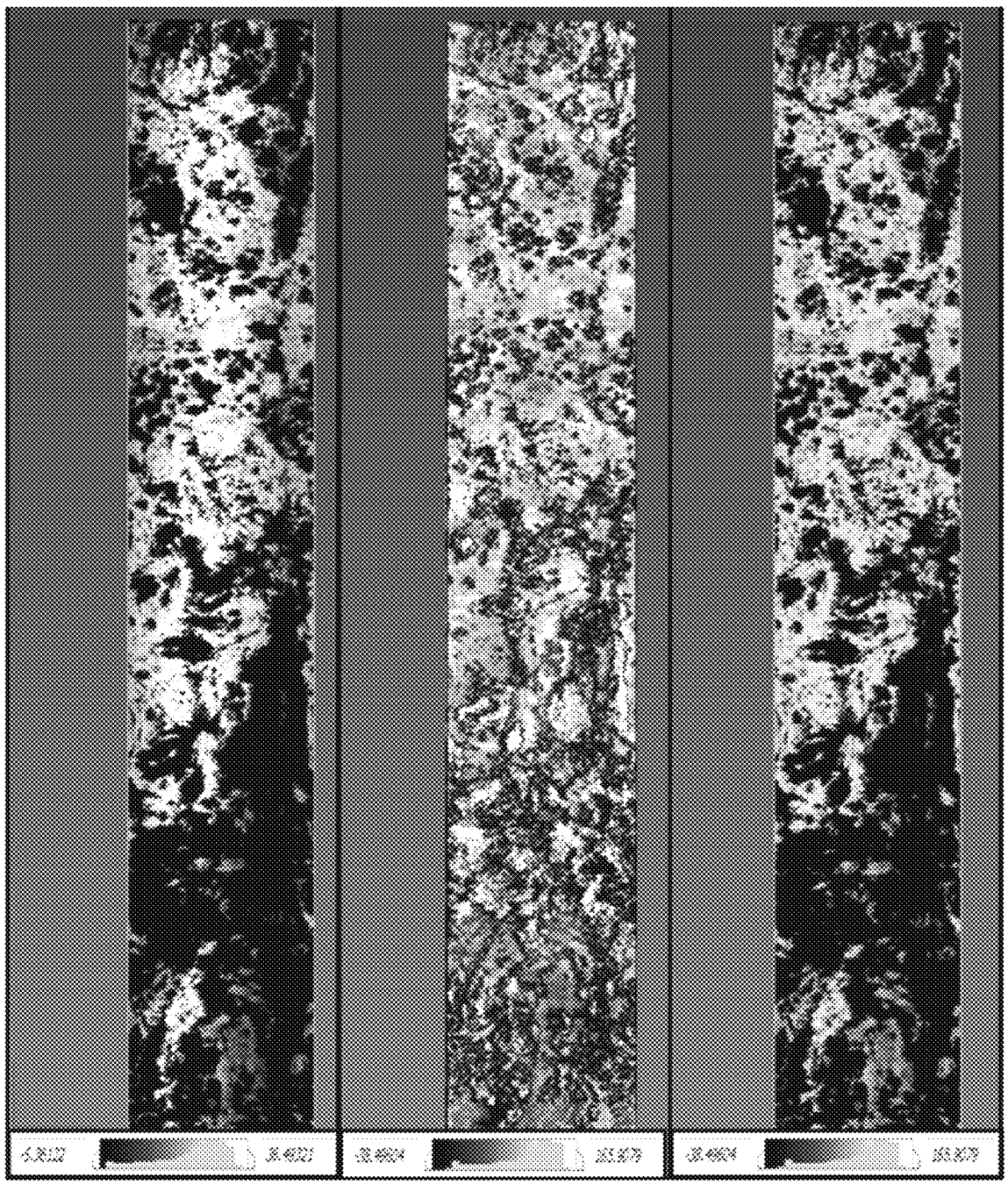
FIGS. 7a-c illustrate a comparison of a second uncorrected ultrasonic amplitude image profile after being corrected after undergoing correction by a known method of the prior art, after being corrected by the method for correcting a profile ultrasonic images by this invention.

FIG. 7 illustrates the ultrasonic amplitude image profile of a reservoir that has both cave and large vug geological structures, in which the first image 7a illustrates the profile without any correction. Then the same profile 7a is shown after undergoing a known correction process of the prior art 7b. Finally, the same profile 7a is shown after undergoing the correction process that is revealed here 7c. Note that after applying the eccentricity correction method of this invention 7c, said geological structures (caves and large vugs) keep their amplitude characteristics significantly lower than the matrix, which allows for distinguishing and segmenting them for quantitative analysis. The image corrected by the known method of the prior art 7b, in turn, offers general homogenization of the image, which distorts the results of the correction, hindering and even making it impossible to distinguish the illustrated vugs and caves.

Thus, in summary, this invention provides an eccentricity correction method of ultrasonic amplitude image profiles after acquisition. The method uses the transit time measurements at each angle as a model of the eccentricity of the tool. Variations in amplitudes generated by the geometric effect of the eccentricity are removed by amplifying the measured amplitude using the reverse decay equation and the amplitude image is rescaled by the average of corrections applied.

$$A_{\theta c} = A_\theta \cdot e^{\left(\frac{t_\theta}{\tau}\right)} / \overline{c}.$$

It is therefore clear that the eccentricity correction method here revealed corrects ultrasonic image profiles, greatly reducing the eccentricity effect, which makes qualitative and quantitative interpretation of geological data from the ultrasound images reliable.

Thus, for the oil and gas industry, the correction method of ultrasonic image profiles shown here is a huge breakthrough for the study and characterization of oil reservoirs, in which ultrasound image profile data is quantitatively analyzed to characterize the reservoir flow capacity at high resolution at the scale of the well, especially in reservoirs with geological structures such as caves, extended fractures and large vugs, since it is widely recognized that the presence of these structures in oil wells represents a significant risk of circulation losses, loss of wells and may even cause problems in production and injection tests.

The quantitative use of these profiles also allows characterization of these structures so that they are incorporated into formation test planning and into the geological model of the reservoirs.

The invention claimed is:

1. A method for correcting eccentricity of ultrasonic image profiles measured along a rock section wherein the rock section is included in a borehole of an uncoated reservoir, the method comprising:
    dropping a tool including an ultrasonic wave transducer in a center of an oil well;
    emitting from the tool an ultrasonic acoustic pulse at an angle $\Theta$, the ultrasonic acoustic pulse having an emitted amplitude value $A_0$, wherein the ultrasonic pulse propagates through drilling fluid until reaching a wall of the oil well;
    receiving a reflected ultrasonic acoustic pulse reflected from a rock wall of the rock section;
    measuring a transit time value $t_\Theta$ corresponding to the reflected ultrasonic acoustic pulse;
    determining a measured amplitude $A_\Theta$ of the reflected ultrasonic acoustic pulse using an amplitude decay model in relation to the transit time $t_\Theta$;
    obtaining a corrected amplitude $A_{\Theta C}$, where the measured amplitude $A_\Theta$ is amplified by an inverse of the amplitude decay model, and re-scaled to an average value by an average ($\overline{c}$) of corrections applied to a plurality of measured amplitudes corresponding to a plurality of angles included in the ultrasonic image profiles,
    wherein the amplitude decay model is defined by $$A_\Theta = A_0 e^{-t\theta/\tau} I_\Theta,$$

wherein $\tau$ is a decay correction factor calculated by an optimization process,
wherein $I_\Theta$ is a reflection coefficient of the rock wall,
wherein the corrected amplitude $A_{\Theta C}$ is defined by:

$$A_{\theta c} = A_\theta \cdot e^{\frac{t_\theta}{\tau}} / \overline{c},$$

wherein the average of the corrections applied ($\overline{c}$) is defined by:

$$\overline{c} = \frac{1}{N} \sum_{\theta=1}^{N} \left( \frac{1}{q} \sum_{prof=1}^{q} e^{-t_\theta(prof)/\tau} \right),$$

and wherein N is a number of the plurality of angles, q is a number of measurement lines in a layer sampled by the ultrasonic acoustic pulse, and prof refers to a depth to which the measurement lines are measured.

2. The method of claim 1, further comprising calculating the decay correction factor ($\tau$) by the optimization process, wherein objective functions related to statistical standard deviation, skewness and kurtosis parameters are used.

3. The method of claim 2, wherein the objective functions comprise a multivariate objective function.

* * * * *